United States Patent
Bruske et al.

(10) Patent No.: US 10,815,151 B2
(45) Date of Patent: Oct. 27, 2020

(54) METHOD AND APPARATUS FOR PRODUCING A REINFORCEMENT MESH

(71) Applicant: Solidian GmbH, Albstadt (DE)

(72) Inventors: Johannes Bruske, Albstadt (DE); Stefan Lohrmann, Rosenfeld (DE)

(73) Assignee: Solidian GmbH, Albstadt (DE)

( * ) Notice: Subject to any disclaimer, the term of this patent is extended or adjusted under 35 U.S.C. 154(b) by 35 days.

(21) Appl. No.: 16/025,711

(22) Filed: Jul. 2, 2018

(65) Prior Publication Data
US 2019/0002345 A1    Jan. 3, 2019

(30) Foreign Application Priority Data
Jul. 3, 2017  (EP) .................................. 17179409

(51) Int. Cl.
*C04B 20/10*   (2006.01)
*E04C 5/07*    (2006.01)
(Continued)

(52) U.S. Cl.
CPC ........... *C04B 20/1029* (2013.01); *B25J 15/00* (2013.01); *B29B 15/125* (2013.01); *B29C 65/08* (2013.01);
(Continued)

(58) Field of Classification Search
CPC . C04B 20/1029; C04B 35/80; B29C 66/7212; B29C 66/71; B29C 65/4815;
(Continued)

(56) References Cited

U.S. PATENT DOCUMENTS 5,595,795 A * 1/1997 Alfred .................... B29C 31/08
                                                      156/291
6,632,309 B1   10/2003 Hendrix
(Continued)

FOREIGN PATENT DOCUMENTS

AT       265826 B     10/1968
DE    19913479 C1     10/2000
(Continued)

OTHER PUBLICATIONS

Extended European Search Report dated Nov. 30, 2017, for European Application No. 17179409.2 (8 pgs.)

*Primary Examiner* — John C Hong
(74) *Attorney, Agent, or Firm* — Fitch, Even, Tabin & Flannery LLP

(57) ABSTRACT

A method and an apparatus for producing a reinforcement mesh. Here, a reinforcement fiber strand is firstly saturated with a resin (H) and cured to form a cured, fiber-reinforced strand material. The strand material present as an endless material is then cut lengthwise into bars, which are then used as longitudinal bars or transverse bars for forming the reinforcement mesh. A connecting material is used at each intersection point between a longitudinal bar and a transverse bar and is dispensed in liquid form at the intersection point or is liquefied and then cured at the intersection point. A fixed connection is thus created between the longitudinal bars and the transverse bars at the intersection points. Between the intersection points, the longitudinal bars and the transverse bars have portions that are free of connecting material.

15 Claims, 8 Drawing Sheets

(51) Int. Cl.
| | |
|---|---|
| *B25J 15/00* | (2006.01) |
| *C03C 25/1025* | (2018.01) |
| *C04B 35/80* | (2006.01) |
| *B29B 15/12* | (2006.01) |
| *B29C 70/22* | (2006.01) |
| *C03C 25/16* | (2006.01) |
| *B29D 28/00* | (2006.01) |
| *B29C 65/00* | (2006.01) |
| *B29C 65/50* | (2006.01) |
| *B29C 65/52* | (2006.01) |
| *B29C 70/84* | (2006.01) |
| *B29C 70/30* | (2006.01) |
| *B29C 65/54* | (2006.01) |
| *B29C 65/48* | (2006.01) |
| *B29C 65/08* | (2006.01) |
| *B29L 28/00* | (2006.01) |
| *B29C 35/08* | (2006.01) |

(52) U.S. Cl.
CPC ........ *B29C 65/483* (2013.01); *B29C 65/5057* (2013.01); *B29C 65/5078* (2013.01); *B29C 65/5085* (2013.01); *B29C 65/524* (2013.01); *B29C 65/542* (2013.01); *B29C 66/1122* (2013.01); *B29C 66/52651* (2013.01); *B29C 66/72141* (2013.01); *B29C 66/8322* (2013.01); *B29C 66/8432* (2013.01); *B29C 70/22* (2013.01); *B29C 70/30* (2013.01); *B29C 70/845* (2013.01); *B29D 28/005* (2013.01); *C03C 25/103* (2013.01); *C03C 25/16* (2013.01); *C04B 35/80* (2013.01); *E04C 5/07* (2013.01); *B29C 65/4815* (2013.01); *B29C 65/4835* (2013.01); *B29C 66/71* (2013.01); *B29C 66/7212* (2013.01); *B29C 66/73941* (2013.01); *B29C 66/83221* (2013.01); *B29C 2035/0811* (2013.01); *B29C 2035/0827* (2013.01); *B29L 2028/00* (2013.01)

(58) Field of Classification Search
CPC ........ B29C 2035/0827; B29C 65/4835; B29C 2035/0811; B29C 66/83221; B29C 66/73941; B29C 65/08; B29C 65/483; B29C 66/52651; B29C 65/542; B29C 70/30; B29C 70/845; B29C 66/1122; B29C 65/5085; B29C 65/5078; B29C 65/524; B29C 65/5057; B29C 66/8322; B29C 66/72141; B29C 66/8432; B29C 70/22; B29D 28/005; C03C 25/16; C03C 25/103; B29B 15/125; B25J 15/00; E04C 5/07; B29L 2028/00

See application file for complete search history.

(56) References Cited

U.S. PATENT DOCUMENTS

| | | | |
|---|---|---|---|
| 7,846,528 B2 * | 12/2010 | Johnson | ................ B29C 70/086 428/119 |
| 8,272,188 B2 * | 9/2012 | Johnson | ................ B29C 70/086 52/782.1 |
| 2002/0144764 A1 | 10/2002 | Heerten | |
| 2009/0145074 A1 | 6/2009 | Tsukamoto | |
| 2016/0089820 A1 | 3/2016 | Schinkinger | |
| 2016/0102457 A1 | 4/2016 | Wheatley | |

FOREIGN PATENT DOCUMENTS

| | | | |
|---|---|---|---|
| DE | 102005043386 | A | 3/2007 |
| EP | 0387968 | A1 | 9/1990 |
| JP | 2003103642 | A | 4/2003 |
| JP | 2013103642 | A | 5/2013 |
| JP | 2013223995 | A | 10/2013 |
| RU | 2394135 | C1 | 7/2010 |
| RU | 2404892 | C1 | 11/2010 |
| RU | 2009121291 | A | 12/2010 |
| RU | 201300087 | A1 | 8/2014 |
| RU | 2548358 | C2 | 4/2015 |
| RU | 158113 | U1 | 12/2015 |
| WO | 2014183146 | A1 | 11/2014 |
| WO | 2017153202 | A1 | 9/2017 |

* cited by examiner

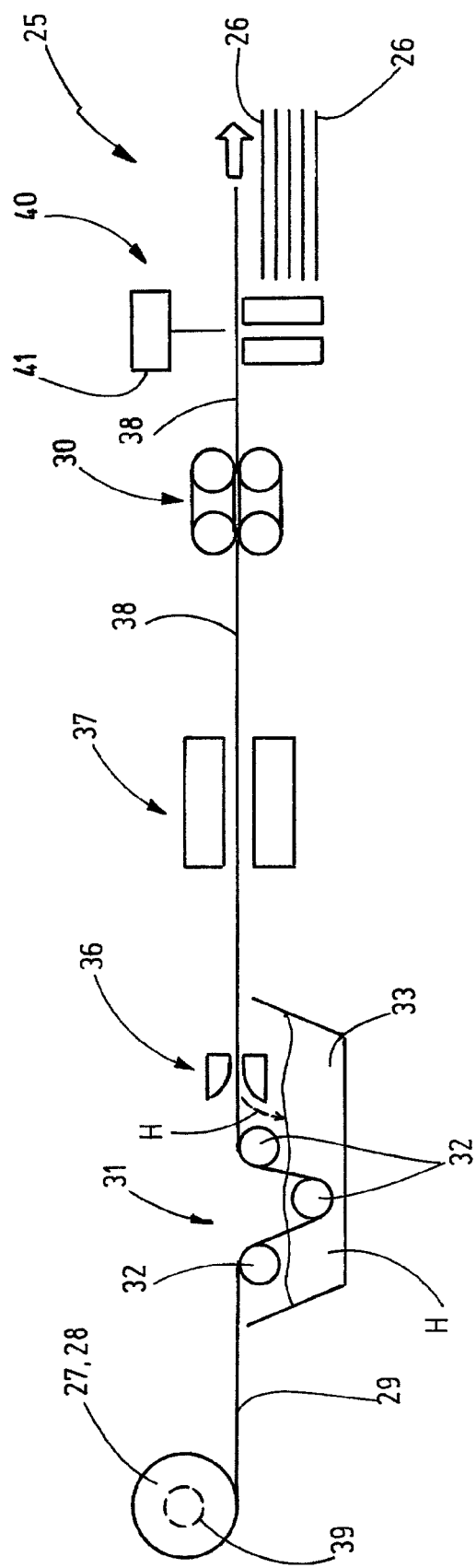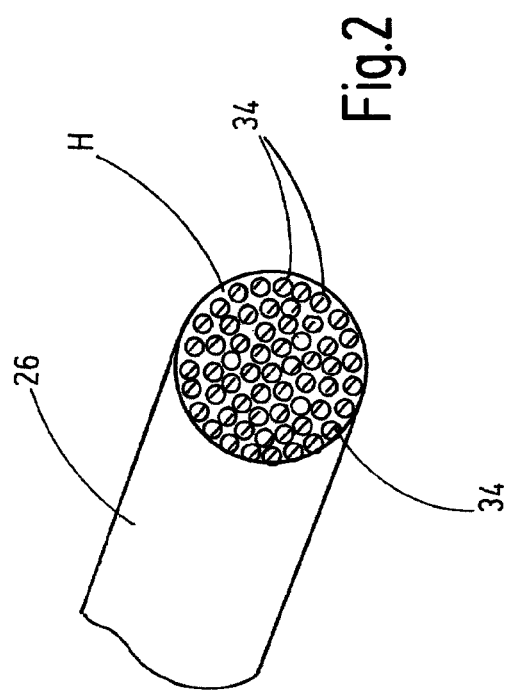
Fig.1
Fig.2

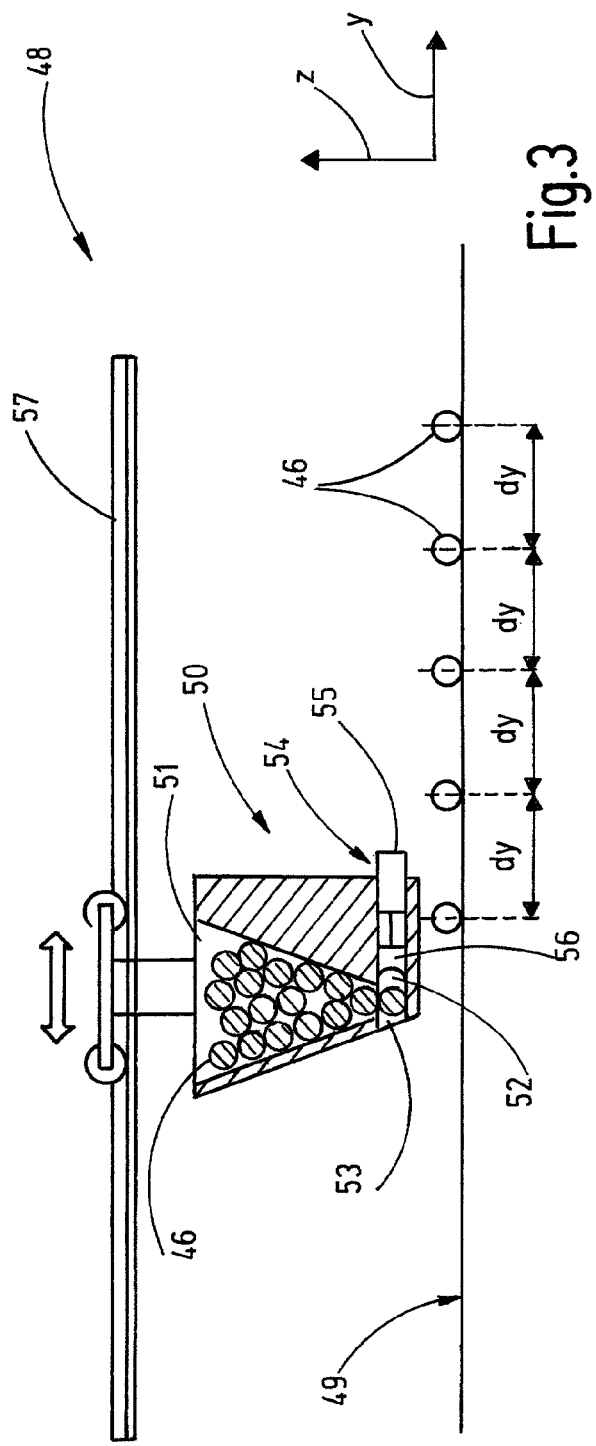
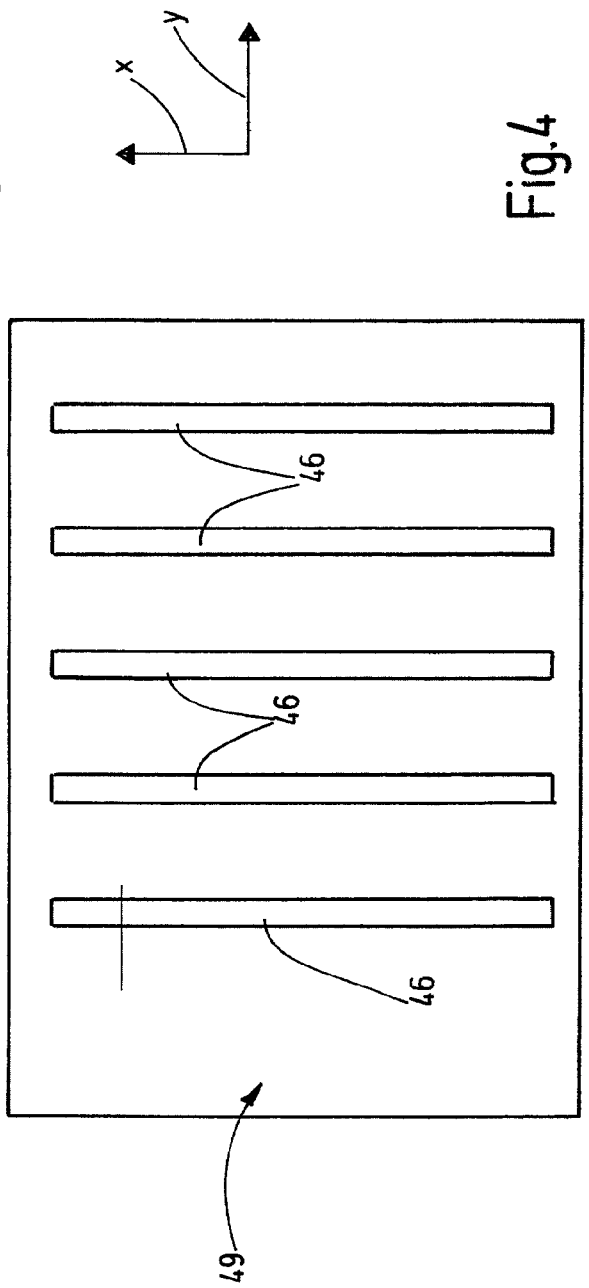

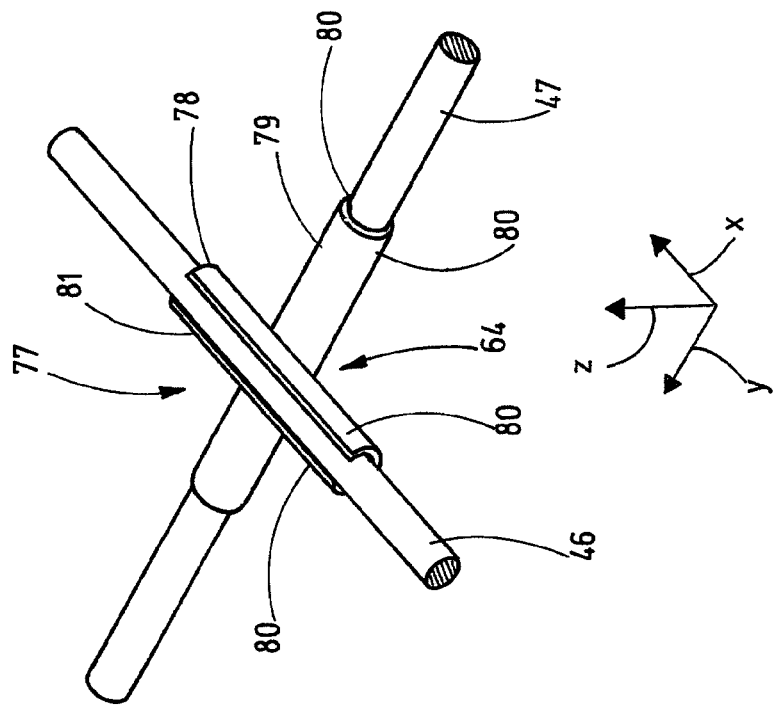
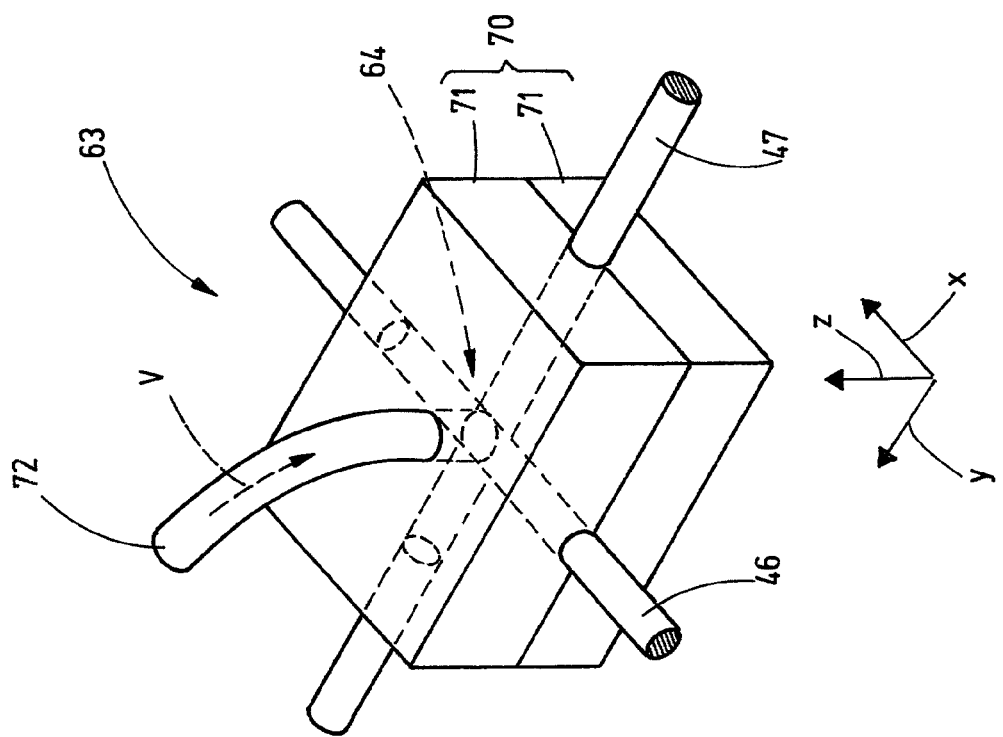

METHOD AND APPARATUS FOR PRODUCING A REINFORCEMENT MESH

RELATED APPLICATION(S)

This application claims the benefit of European Patent Application No. 17179409.2, filed Jul. 3, 2017, the contents of which are incorporated herein by reference as if fully rewritten herein.

TECHNICAL FIELD

The invention relates to a method and an apparatus for producing a reinforcement mesh. The reinforcement mesh can be used for example for incorporation in a concrete body or a cement matrix.

BACKGROUND

In the construction sector, steel-reinforced component parts are nowadays used primarily. It has long been known to produce reinforcement meshes or steel mesh mats by welding steel bars to one another.

It is also known from vehicle construction to produce component parts, such as hull parts of boats or aircraft or body parts, from fiber-reinforced composite materials. For this purpose, what are known as rovings or fiber mats formed from rovings are incorporated in a plastics matrix.

In order to produce reinforcements or meshes of this kind, various methods have been proposed. DE 199 13 479 C1 describes the production of a geogrid with intersecting thermoplastic bars which are welded to one another.

In the case of the reinforcement mesh or reinforcement component part known from DE 10 2005 043 386 A1, the bars are mechanically connected to one another at the intersection points by means of connecting fibers, in particular glass fibers, more specifically prior to saturation with resin.

RU 201300087 A1 describes the production of a reinforcement mesh, wherein the longitudinal bars are provided with a spiral winding, in which the transverse bars are incorporated at the intersection points.

A method for producing a fabric with Leno weave is known from EP 0 387 968 A1. This fabric can then be incorporated in a corresponding plastics matrix to form the fiber-reinforced composite materials.

JP 2013-103642 A discloses a method for producing a mesh body, in which the longitudinal elements are saturated with a resin, and transverse elements saturated with a resin are then arranged on said longitudinal elements. The resultant mesh structure is connected at the intersection points in that the resin with which the longitudinal and transverse elements are saturated is cured. Similar methods are also known for example from JP 2013-223995 A, RU 2009 121 291 A and US 2016/0102457 A1.

In the case of the method known from RU 2394135 C1, rovings are supplied to a bath and are saturated with resin. Excess resin is then pressed out from the saturated rovings. Transverse elements are laid on the saturated strands. By applying pressure and heat, the longitudinal elements are connected to the transverse elements. A similar method is also described in RU 2404892 C1.

A further production method for a reinforcement mesh provides conveying longitudinal elements parallel to one another in a mold and arranging a transverse element transversely thereto through the mold. The mold surrounds the intersection points between the longitudinal elements and the transverse element, and connecting material is supplied to the mold. The transverse element and the longitudinal elements are connected to one another at the intersection points (RU 2548358 C2).

In the method known from U.S. Pat. No. 6,632,309 B1, a fabric is impregnated with resin, placed in a mold, and cured in order to produce a reinforcement mesh. The fabric can thus be cured in different three-dimensional designs and forms a three-dimensional body.

Proceeding from the prior art, the object of the present invention is to produce a reinforcement mesh in such a way that the amount of waste material is minimised. In particular, the further processing of the produced reinforcement mesh shall also be improved.

SUMMARY

This object is achieved by a method and an apparatus having the features as described herein.

In the method according to the invention for producing a reinforcement mesh, a reinforcement fiber strand is firstly supplied by means of a conveying device to a saturation station. The reinforcement fiber strand can also be referred to as a "roving". The reinforcement fiber strand is formed from one or more filaments and can be embodied in the form of a reinforcement yarn. Synthetic fibers and/or natural fibers can be used as filaments, for example glass fibers of different types (for example AR glass fibers), carbon fibers or basalt fibers.

In the saturation station the reinforcement fiber strand is saturated with a resin, in particular a thermosetting resin, such as epoxy resin, vinyl ester resin or polyester resin. The reinforcement fiber strand is in particular conveyed continuously through the saturation station, for example through a bath. Alternatively, the resin could also be applied to the reinforcement fiber strand in the saturation station by means of a spraying device or another application device.

At the end of the saturation station, excess resin is removed in a stripping device and for example can be fed back to the resin store of the saturation station. The amount of resin remaining in the reinforcement fiber strand is sufficient to form a plastics matrix for binding of the reinforcement fiber strand. The saturated reinforcement fiber strand can be conveyed, preferably by means of the conveying device, from the stripping device to a curing station, where the resin is cured in order to form a cured fiber-reinforced strand material. Alternatively, the resin-saturated reinforcement fiber strand forms an uncured fiber-reinforced strand material after the stripping. This cured or uncured strand material is conveyed further to a cutting station, preferably by means of the conveying device, and is cut up there into bars of appropriate length. In particular, these cured bars can be stored in the meantime without difficulty and do not have to be further processed immediately. It is preferred if the cutting station is controlled in such a way that each bar has a defined length depending on the desired form of the reinforcement mesh. Here, the lengths of the bars can differ from one another.

Some of the bars are placed side-by-side as longitudinal bars. This action can be performed for example by means of a manipulator device. A plurality of further bars are placed as transverse bars on the longitudinal bars, for which purpose the manipulator device can be used. One or more grippers, robots, portal devices or the like can be used as manipulator device.

For connection of the longitudinal bars to the transverse bars, curable connecting material is used in an alternative of the method. Said material is applied exclusively in the region of intersection points, at each of which a longitudinal bar and a transverse bar cross one another and are placed against one another or are already in contact. The curable connecting material can be applied to the longitudinal bars either prior to the depositing of the transverse bars or alternatively subsequently, once the transverse bars have been deposited on the longitudinal bars. Here, the bars are not provided over their entire length with the connecting material, but instead merely at or in the region of the intersection points. Each bar, between two adjacent intersection points, has a portion that is free of curable connecting material. In the regions in which the bars are free of connecting material, the property of the bar remains unchanged, for example its bending property or deformability. Any impairments to the deformation property caused by additional application and curing of the connecting material are avoided in the portions between the intersection points. The produced reinforcement mesh can thus be easily further processed, or any three-dimensional reinforcement bodies can be formed from the bars, wherein the bars can extend not only parallel to a plane (as in the case of a two-dimensional mesh), but also at right angles or at an incline to this plane. For example, additional bars can be connected to the reinforcement mesh between the intersection points already provided, for example again by application of a curable connecting material and subsequent curing. In this way, for example two produced reinforcement meshes can also be connected to one another, for example in order to form a T-shaped or an angled reinforcement mesh element or a three-dimensional reinforcement body.

In addition, the required amount of connecting material can be kept as small as possible.

Once the connecting material has been applied at the intersection points, said material is cured by means of a curing device, so that the transverse bars are fixedly connected to the longitudinal bars at the intersection points.

Alternatively, the connection between the longitudinal and transverse bars can be established without additional connecting material when at least one of the bars is not yet cured at each intersection point, i.e. consists of an uncured fiber-reinforced strand material. In this case, the bars resting against one another are cured jointly by means of the curing device, so that the transverse bars are fixedly connected to the longitudinal bars at the intersection points.

The curing device can be configured similarly to the curing station, for example by means of a furnace or another heating device. The heating in a furnace can also be provided inductively when the bars contain electrically conductive material, for example when carbon fibers are used. Depending on the way in which the resin or the connecting material cures, other devices can also be used in the curing station or as a curing device, for example a device for radiating electromagnetic waves, such as light, in particular UV light. Devices for introducing ultrasonic waves can also be used.

It is preferred when the saturated reinforcement fiber strand is held under tensile stress during the curing. The tensile stress can be applied by the conveying device which removes the reinforcement fiber strand from a store, for example unwinds it from a supply roll or reel and pulls it through the saturation station and the curing station. It can be advantageous if a braking device is provided in the store of the reinforcement fiber strand, which braking device counteracts the tensile force of the conveying device in order to hold the reinforcement fiber strand under a defined tensile stress.

For example, a resin can be used as connecting material. It is advantageous if the curing property of the resin used as connecting material differs from the curing property of the resin of the longitudinal bars and transverse bars. A softening of the matrix of the longitudinal and transverse bars during the curing of the connecting material can thus be prevented. For example, the connecting material can cure at a lower temperature than the resin of the longitudinal and transverse bars. Alternatively, resins that are cured by different physical or chemical processes can also be used. For example, one resin can cure by heat, whereas the other resin cures by irradiation with light, for example UV light. It is also possible to choose one of the resins in such a way that it cures chemically by application of a curing substance, whereas the other resin cures by heat and/or irradiation. These various curing principles can be combined arbitrarily. The curing effects of the used resins preferably differ sufficiently either in respect of the physical and/or chemical principle and/or do not have any overlapping working ranges (temperature and/or light wavelength, etc.) during the curing.

It is preferred when the reinforcement fiber strand and the cured or uncured fiber-reinforced strand material are conveyed in the form of endless material as far as the cutting device by means of a common conveying device. A simple production apparatus can thus be achieved. In particular, the conveying device can be arranged after an optional curing station and before the cutting station and can exert there an appropriate tensile force onto the fiber-reinforced strand material. The conveying device can also exert a thrust force onto the cured fiber-reinforced strand material in order to convey it to the cutting station.

It is advantageous when a defined amount of the connecting material is applied by means of a dispensing device to a transverse bar at all intersection points thereof and the transverse bar is then laid on the longitudinal bars. The connecting material can be applied to the intersection points of the transverse bar at the same time.

In another exemplary embodiment the dispensing device can apply a defined amount of the connecting material to the longitudinal bars at all intersection points, preferably one after the other, wherein the transverse bars are then laid on the longitudinal bars.

The connecting material preferably has a viscosity such that it adheres to the intersection points as a cohesive connecting material blob or connecting material drop, without flowing away.

The connecting material can also be applied to an intersection point by means of a mold having two or more mold parts. The mold parts can surround respective intersection points and preferably precisely one intersection point, so that in the closed mold, from which the corresponding longitudinal bar and the corresponding transverse bar protrude, the connecting material can be selectively introduced and cured at the intersection point.

In a further preferred embodiment push-on connection parts are used in order to connect in each case a longitudinal bar and a transverse bar at an intersection point in a preliminary manner so to speak. The push-on connection part is pushed onto or clipped onto the bars at the intersection point and is held there, in particular in a frictionally engaged and/or interlocking manner. For example, it can have two resiliently preloaded limbs, which move away from one another resiliently as said push-on connection part is pushed on and which surround the associated longitudinal bar or transverse bar in a positively engaged and/or interlocking manner at least partially, once the push-on connection part has been pushed on. The push-on connection part can therefore have two pairs of limbs of this kind for each one of the bars at the intersection point.

Once the connection of the longitudinal bars and the transverse bars has been established by means of the push-on connection parts, a connecting material can be applied optionally to portions of each longitudinal bar and each transverse bar in contact with the push-on connection part. In particular, a connection means of low viscosity is used for this purpose, which can flow very easily into remaining very small gaps between the surface of the bar in question and the push-on connection part. This applied connecting material can then be cured.

An alternative possibility lies in the fact that the dispensing device is designed to deliver energy and to input it at the intersection point. Here, a portion of the plastics material of the push-on connection part can be made flowable and can then be cured again. The plastics material of the push-on connection parts thus joins to the longitudinal bar or transverse bar in question. The dispensing device can be designed for example to introduce heat or ultrasonic waves. The heating can be provided by induction when the bars and/or the push-on connection part contain electrically conductive material. The type and amount of delivered energy is adapted to the plastics material of the push-on connection part in such a way that preferably only the plastics material of the push-on connection part is made liquid or flowable, whereas the resin of the bars remains solid. It is also possible to make both the plastics material of the push-on connection part and the resin of the bars liquid or flowable. Here, some of the plastics material of the push-on connection part constitutes the connecting material used for the connection. Here as well it is advantageous if the connecting material and the resin of the bars have different properties in respect of their curing or softening, so that the resin of the bars is not damaged by the introduction of energy, and instead merely the plastics material of the push-on connection part is affected.

BRIEF DESCRIPTION OF THE DRAWINGS

Advantageous embodiments of the invention will become clear from the dependent claims, the description, and the drawings. Preferred exemplary embodiments of the invention will be explained in detail hereinafter with reference to the drawings, in which:

FIG. 1 shows a schematic, block diagram-like illustration of an apparatus and a method for producing bars, FIG. 2 shows a sectional illustration through part of a bar in a perspective view, FIG. 3 shows a schematic, block diagram-like illustration of a device for depositing bars on a support surface, FIG. 4 shows the bars deposited on the support surface according to FIG. 3 in a schematic plan view, FIG. 9 shows a schematic perspective illustration of an exemplary embodiment of the dispensing device formed of a mold with two mold parts for dispensing connecting material at an intersection point, FIG. 10 shows an intersection point between a longitudinal bar and a transverse bar, wherein the bars are connected to one another at the intersection point by means of a push-on connection part.

DETAILED DESCRIPTION

Figure 6:
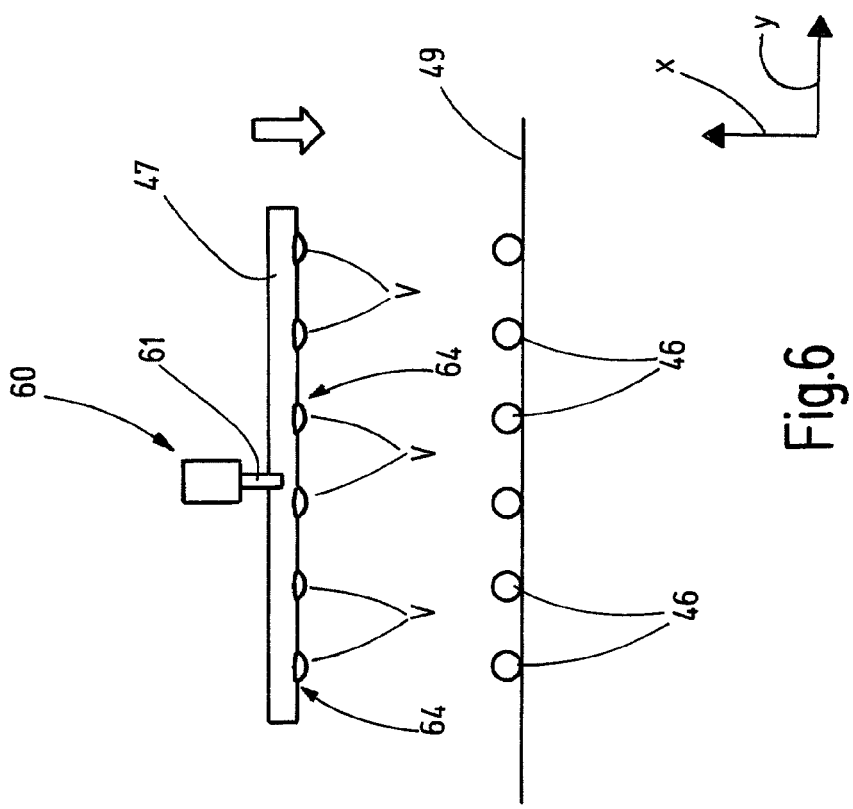
FIG. 6 shows a schematic illustration of the depositing of a transverse bar on longitudinal bars deposited on the support surface.

FIG. 1 shows an exemplary embodiment of an apparatus 25 which is designed for the production of bars 26 made of fiber-reinforced plastic. The apparatus 25 has a storage device 27, for example at least one reel 28. The reinforcement fiber strand 29 is preferably unwound from the reel 28 and supplied to the further processing station. To this end, a conveying device 30 is provided in the exemplary embodiment according to FIG. 1. The conveying device 30 can have one or more rolls or cylinders and/or at least one conveying belt for exerting a tensile force onto the reinforcement fiber strand 29 suitable for removing the reinforcement fiber strand 29.

The reinforcement fiber strand 29 is supplied to a saturation station 31. The saturation station 31 can have a plurality of deflection rolls or deflection cylinders 32, around which the reinforcement fiber strand is guided through a bath 33 of liquid resin H and is thus saturated with the resin H. The resin H adheres to the outer surface of filaments 34, which form the reinforcement fiber strand 29 (FIG. 2).

The saturated reinforcement fiber strand 29 is then supplied to a stripping station 36. The stripping station 36 is designed to strip excess resin H from the saturated reinforcement fiber strand 29. In accordance with the example, the stripping station is arranged vertically above the bath 33, so that the stripped resin H is fed back into the bath 33, this being illustrated in a heavily schematised manner in FIG. 1 by the dashed arrow.

After the stripping station 36, the resin H is cured in one embodiment in a curing station 37. Depending on the used resin H, the curing is performed by a physical and/or chemical process. This is dependent on the curing property of the resin H. For example, heat and/or UV light can act on the resin H in the curing station 37. The energy can be introduced for example also by induction when the resin H and/or the reinforcement fiber strand 29 contains electrically conductive material. Alternatively or additionally, chemical agents can also be applied to the saturated reinforcement fiber strand 29 in order to cure the resin H in the curing station 37.

As a result of the curing of the resin H, a cured, fiber-reinforced strand material 38 is created. It is also possible to further process the resin-saturated reinforcement fiber strand 29 without curing the resin H, i.e. as an uncured, fiber-reinforced strand material 38. In this case, the curing station 37 can be spared or the reinforcement fiber strand 29 can be conveyed through the non-operated curing station 37 or past the curing station 37.

In accordance with the example, a tensile force is exerted onto the cured or uncured fiber-reinforced strand material 38 by means of the conveying device 30 and thus also acts on the reinforcement fiber strand 29 as far as the storage device 27 or reel 28. A removal or conveyance of the reinforcement fiber strand 29 and of the strand material 38 is thus achieved. The reel 28 or the storage device 27 can optionally be assigned a braking device 39. A tensile force which acts on the reinforcement fiber strand 29 can thus be adjusted in a defined manner, so that the reinforcement fiber strand is held under tensile stress during the optional curing 37. The braking device 39 can also optionally be arranged as a separate device before the curing station 37 and for example can have braked rolls, cylinders, conveying belts or the like, which counteract the removal force of the conveying device 30 and maintain a tensile stress of the saturated reinforcement fiber strand 29 in the curing station 37. The tensile force can be controlled by open-loop or closed-loop control.

The strand material 38 can also receive thrust forces in its direction of extent in order to be transported on further. It can therefore be moved on further, through the conveying device 30, to a cutting station 40 having a cutting device 41. The cutting device 41 cuts the strand material conveyed as endless material, whereby the bars 26 are formed. In the exemplary embodiment described here, the bars 26 have a circular cross-section (FIG. 2). Alternatively, other cross-sectional shapes can also be formed, for example polygonal or elliptical cross-sections or other arbitrary cross-sectional shapes that are curved and/or angled in portions. A shaping of this kind can be achieved for example in the curing station 37 by appropriate shaping means. For example, the saturated reinforcement fiber strand 29 can be conveyed by suitably shaped cross-section channels in the curing station 37.

The produced bars 26 are then used to form a reinforcement mesh 45 formed of a plurality of longitudinal bars 46 and a plurality of transverse bars 47.

The longitudinal bars 46 are firstly deposited on a support surface 49 by means of a manipulator device 48. Adjacent longitudinal bars 46 are arranged here at a distance dy from one another. The support surface 49 is oriented parallel to a plane that is spanned by an x direction and a y direction of a Cartesian coordinate system. In accordance with the example, the longitudinal bars 46 extend parallel to one another in the x direction. Alternatively, they could also be oriented at an acute angle, inclined relative to the x direction. The distance dy between two longitudinal bars 46 can be constant or can vary (FIGS. 3 and 4).

In the exemplary embodiment illustrated schematically in FIG. 3, the manipulator device 48 has a separating unit 50 movable parallel to the y direction in order to deposit the longitudinal bars 46. The longitudinal bars 46 are deposited one after the other in a funnel-shaped storage container 51. At its lower, tapered region, the funnel-shaped storage container 51 has an opening, which is dimensioned transversely to the direction of extent of the longitudinal bars 46 in such a way that merely one of the longitudinal bars 46 can pass through the opening into a dispensing shaft 52. The dispensing shaft 52 is closed downwardly and is provided laterally with a slot-like opening 53, through which the longitudinal bar 46 disposed in the dispensing shaft 52 can be dispensed by means of an actuator 54 and can be deposited onto the support surface 49. The actuator 54 for example has a slide 56, which can be actuated by a linear drive 55, for example a fluidically actuatable cylinder, and by means of which the longitudinal bar 46 disposed in the dispensing shaft 52 can be pushed out from the slot-like opening 53 and can be deposited on the support surface 49.

The separating unit 50 can be moved on the whole parallel to the support surface 49, for example along a rail 57, which can be seen schematically in FIG. 3. In order to move the separating unit 50, a corresponding drive (not shown) can be provided.

By means of the storage of a plurality of longitudinal bars 46, a greater number of longitudinal bars 46 can be deposited on the support surface 49 very quickly by means of the manipulator device 48 from FIG. 3.

Figure 5:
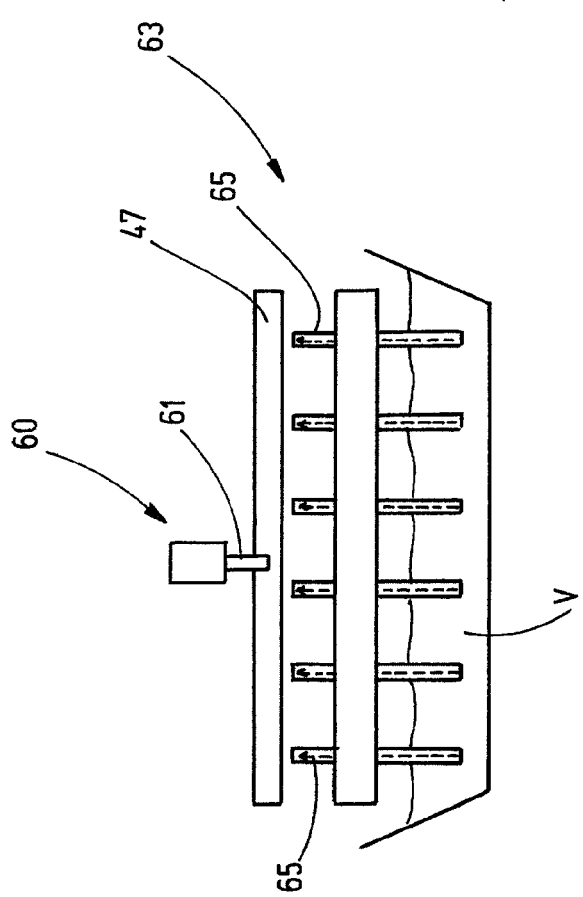
FIG. 5 shows a schematic illustration of a dispensing device for dispensing a connecting material onto a bar.
Figure 8:
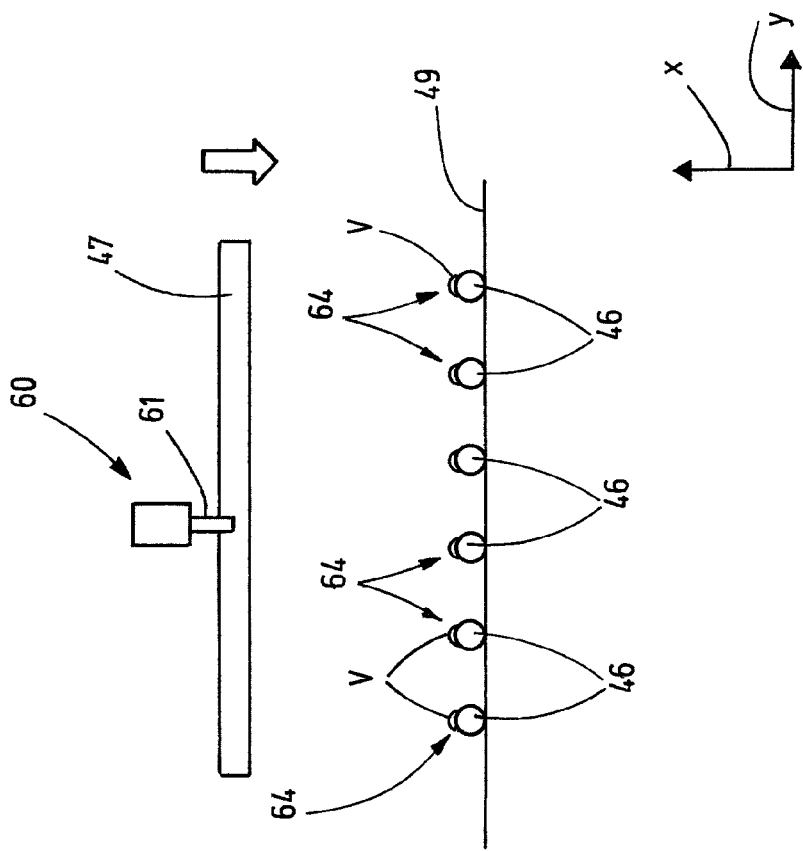
FIG. 8 shows a schematic illustration of the depositing of a transverse bar on the longitudinal bars.

Alternatively to the embodiment shown in FIG. 3, the manipulator device 48 can also be formed by a gripping device 60 having gripper fingers 61, as is shown in a heavily schematised manner in FIGS. 5, 6 and 8. The gripper device 68 can be arranged for example on a multiaxial robot arm or on a multiaxial portal or another multiaxial positioning device.

The above-described manipulator device 48 can be used traditionally to deposit the longitudinal bars 46 on the support surface 49 and also to deposit the transverse bars 47 on the longitudinal bars 46. For example, the same gripper device 60 can grasp and deposit both the longitudinal bars 46 and also the transverse bars 47. The manipulator device 48 shown in FIG. 3 can be designed for example such that the separating unit 50 is rotatable about an axis extending in the z direction. Both longitudinal bars 46 and transverse bars 47 can then be stored in the storage container 51. Alternatively, two separating units 50 of this kind can be provided. The separating unit 50 designed to deposit the transverse bars 47 must be movable at least in the x direction along the support surface 49. In all embodiments and in particular when a single separating unit 50 is used, this can be embodied such that it is movable both in the x direction and in the y direction parallel to the support surface 49.

Figure 13:
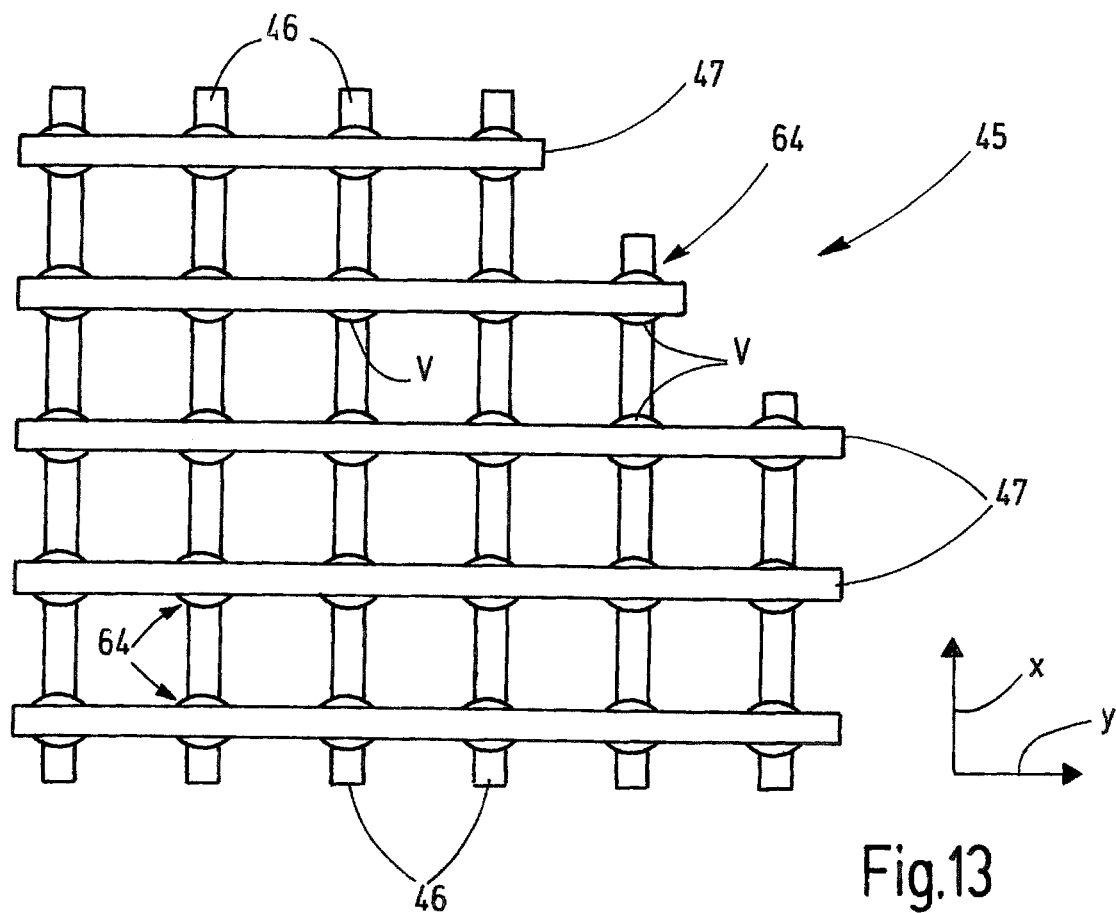
FIG. 13 shows a schematic plan view of a produced reinforcement mesh formed of longitudinal bars and transverse bars.
Figure 15:
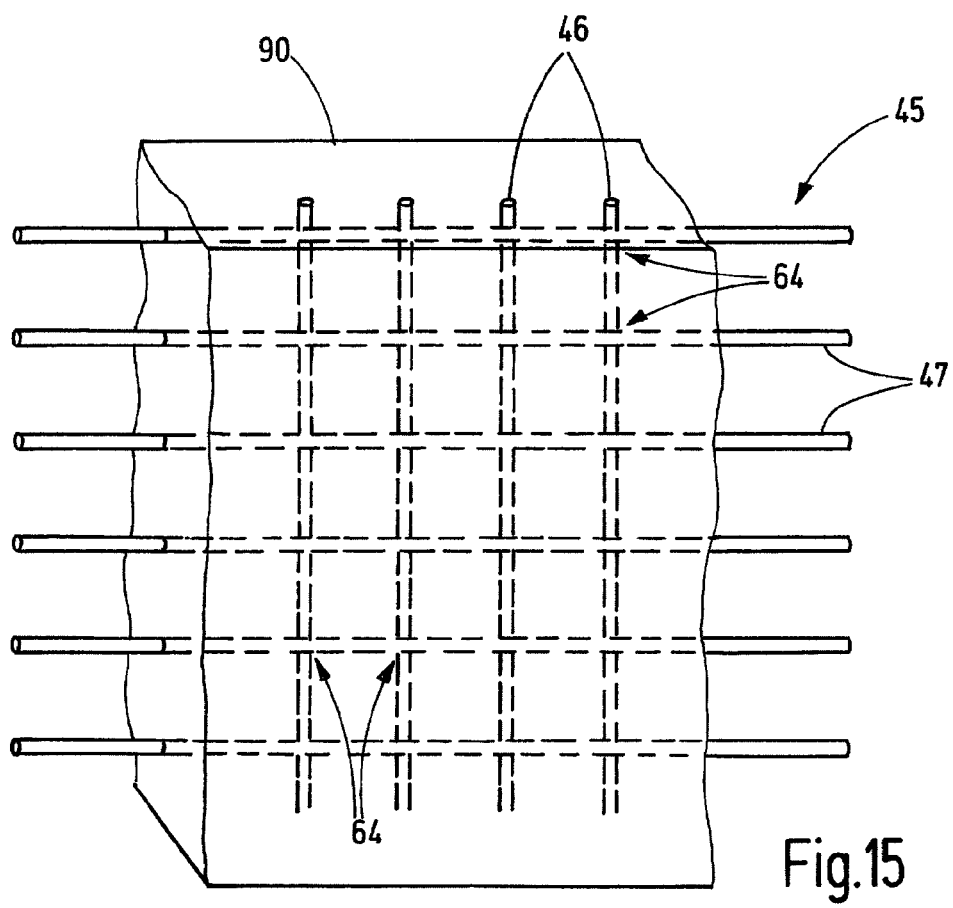
Figure 16:
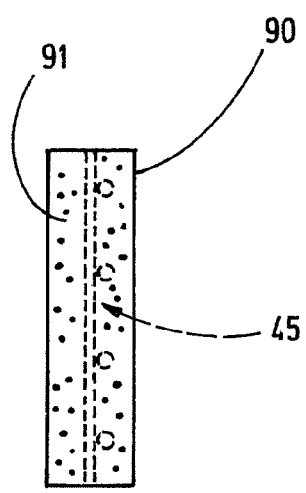

The longitudinal bars 46 and the transverse bars 47 are in contact with one another at intersection points 60 (FIGS. 13 and 15). In one embodiment, a connecting material V is applied in each case in a defined amount to each intersection point 60 with the aid of a dispensing device 61. The connecting material V can be dispensed selectively at each intersection point 60 prior to the transverse bars 47 being deposited on the longitudinal bars 46 or thereafter. The connecting material V is dispensed in liquid form at each intersection point 60 and is then cured in order to connect the transverse bars 47 to longitudinal bars 46. The connecting material V for example can be a resin. The resin used as connecting means V can differ from the resin H that forms the plastics matrix of the bars 26, in particular in respect of the curing and softening of the respective resins. It is preferred if both resins differ here. For example, they can be softened and/or cured by different physical and/or chemical processes or they can be softened and/or cured by the same physical or chemical processes, wherein the process conditions then differ from one another. The connecting material V can be liquefied and/or cured selectively, without significantly changing the state of the resin H, and vice versa. For example, in the case of curing as a result of the introduction of heat, the temperature of the curing of the two resins can be different. In particular, the temperature for the curing of the resin used as connecting material V can be the same as or lower than the temperature for the curing of the resin H used as plastics matrix of the bars 26.

Figure 14:
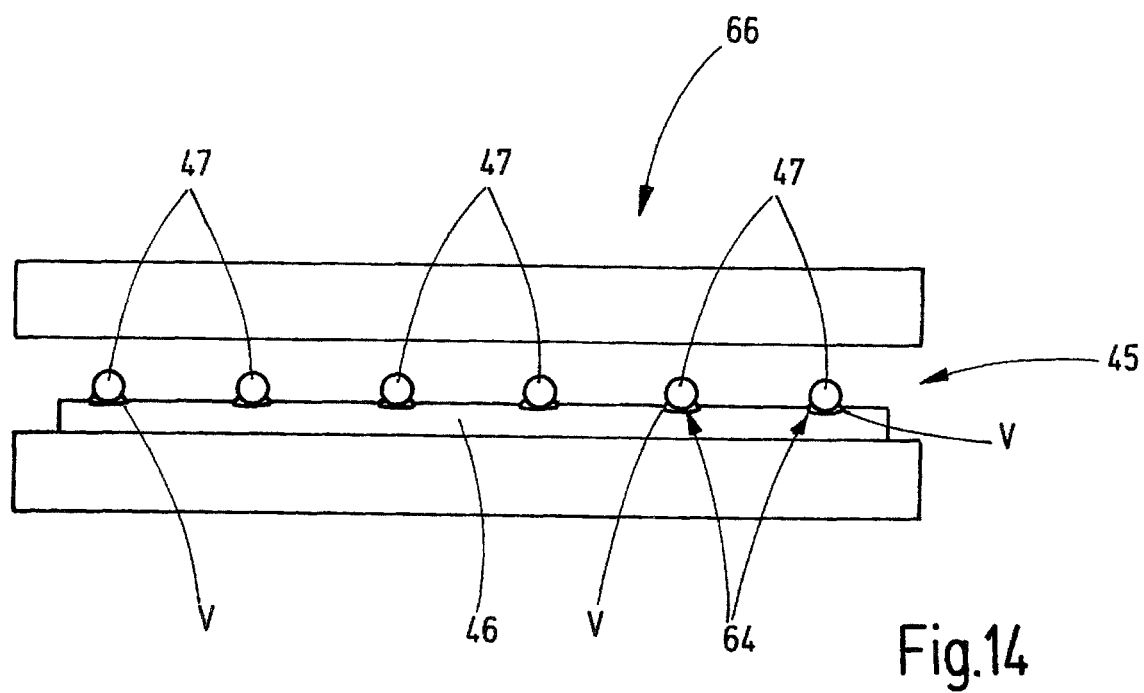
FIG. 14 shows a schematic basic diagram of a curing device for curing the connecting material, FIGS. 15-18 each show a schematic illustration of a component with a cement matrix, in which at least one reinforcement mesh is incorporated.

FIGS. 5 and 6 schematically show a possibility for applying the connecting material V to the transverse bars 47 prior to the transverse bars 47 being deposited on the longitudinal bars 46. Here, liquid connecting material V from a bath comprising liquid connecting material V is removed from the bath by a plurality of pipes or lines 65 and is applied in a defined amount to a transverse bar 47. The pipes or lines 65 are arranged at a distance from one another, corresponding to the distance of the longitudinal bars 46 to which the transverse bar 47 in question is to be connected. The distances between the pipes or lines 65 can be adjusted depending on the transverse bar 47 to which the connecting material V is to be applied. The transverse bar 47 is for this purpose positioned by means of a manipulator device 48, and in accordance with the example by means of a gripping device 60, at the open ends of the pipes or lines 65 of the dispensing device 63, and the connecting material V is then applied in a defined amount to an intersection point 60 on the transverse bar 47 by means of the dispensing device 63 through the pipes or lines 65 (FIG. 5). The transverse bar 47 is then deposited on the associated longitudinal bars 46 by means of the gripping device 60 (FIG. 6). In this way, the mesh structure of the reinforcement mesh 45 can be formed. The connecting material V is then cured with use of a curing device 66 (FIG. 14). The curing device 66 can be formed analogously to the above-described curing station 37 from FIG. 1 and for example can be formed by a heating device. As already explained, the temperature here at the time of curing of the connecting material V is preferably the same as or lower than the temperature in the curing station 37 during the curing of the resin H.

Figure 7:
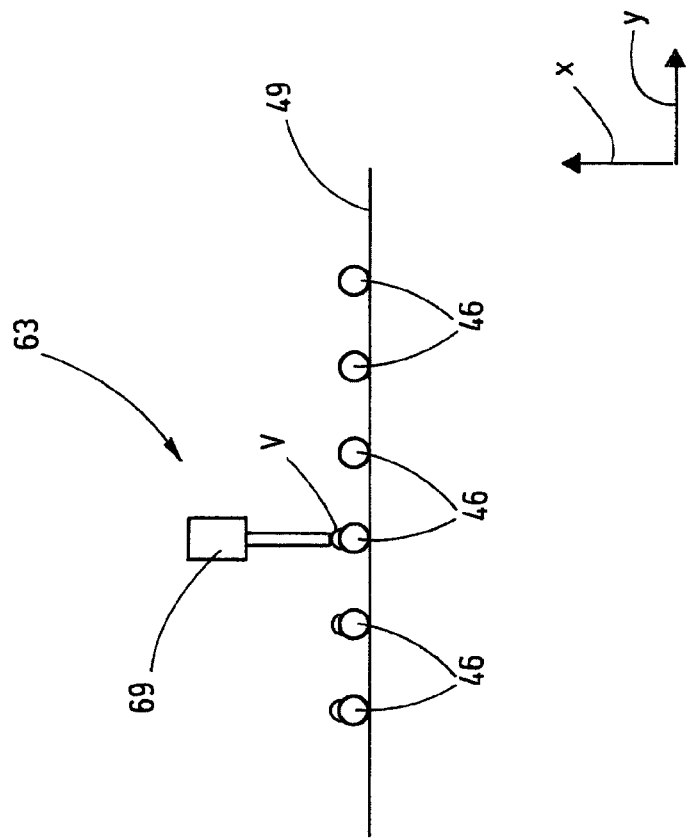
FIG. 7 shows a schematic illustration of a further exemplary embodiment of a dispensing device for applying connecting material to longitudinal bars deposited on a support surface.

FIGS. 7 and 8 schematically show a modified process sequence. The dispensing device 63 here has a metering device 69 movable parallel to the x-y plane and/or in the z direction. The metering device 69 is designed to dispense a defined amount of the liquid connecting material V at each intersection point 64. The connecting material V is preferably applied to the longitudinal bars 46 deposited on the support surface 49. The transverse bars 47 are then deposited by means of the manipulator device 48, and in accordance with the example the gripper device 60, on the intersection points 64 and on the longitudinal bars 46. The mesh structure is then cured, as described above by means of the curing device 66, in order to fixedly connect the longitudinal bars 46 and the transverse bars 47 to one another.

A further possibility for applying the connecting material V is shown schematically in FIG. 9. In this embodiment the dispensing device 63 has a mold 70 formed of at least two mold parts 71. The two mold parts 71 can be closed in a fluid-tight manner around an intersection point 64, at which a longitudinal bar 46 and a transverse bar 47 intersect. Here, a portion of a longitudinal bar 46 and a portion of a transverse bar 47 are in each case disposed within the closed mold 70. The mold cavity around these portions of the bars 46, 47 is larger by a predefined amount than the cross-section of the respective bars 46, 47. The liquid connecting material V is introduced into the mold 70 via a feed line 72 and encases the portions of the bars 46, 47 disposed in the closed mold 70. The connecting material V is then cured within the mold 70 or alternatively outside the mold 70, as described above, by means of the curing device 66.

In order to form the mesh structure of the reinforcement mesh 45, the connecting material V can be applied to each intersection point 64 by means of a mold 70. The connecting material V can be a resin or another plastics material, by means of which the portions of the bars 46, 47 are encapsulated at the intersection point 64.

A further possibility for connecting a longitudinal bar 46 and a transverse bar 47 at an intersection point 64 will be described with reference to FIGS. 10-12. In this example, a push-on connection part 77 is provided at each intersection point. The push-on connection part 77 is made of plastic and in accordance with the example is formed integrally. The push-on connection part 77 has a longitudinal part 78, which is associated with the longitudinal bar 46 in question, and a transverse part 79, which is associated with the transverse bar 47 in question. In accordance with the example the longitudinal part 78 and the transverse part 79 are identical. The longitudinal part 78 and the transverse part 79 have two mutually opposed clamping limbs 80. The clamping limbs 80 can be deflected resiliently away from one another and between their free ends define a slot 81. The width of the slot 81 between the two free ends of the clamping limbs 80 is smaller than the dimension of the corresponding longitudinal bar 46 or transverse bar 47. The longitudinal bar 46 or the transverse bar 47 can be moved between the clamping limbs 80 by means of the slot 81. Adjacently to the slot 81, the clamping limbs 80 delimit a receiving region, the cross-section of which corresponds approximately to the cross-section of the corresponding bar 46 or 47. The cross-section of the receiving region can be selected to be slightly smaller than the outer dimension of the bar in question, so as to provide a clamping effect between the relevant longitudinal part 78 or transverse part 79 and the portion of the relevant longitudinal bar 46 or transverse bar 47 received in the receiving region.

In the exemplary embodiment shown in FIG. 10, the bars 46, 47 are provided with a circular cross-section. The longitudinal part 78 and the transverse part 79 are each formed by a hollow-cylindrical sleeve provided with a slot 81 passing fully through said sleeve.

Figure 11:
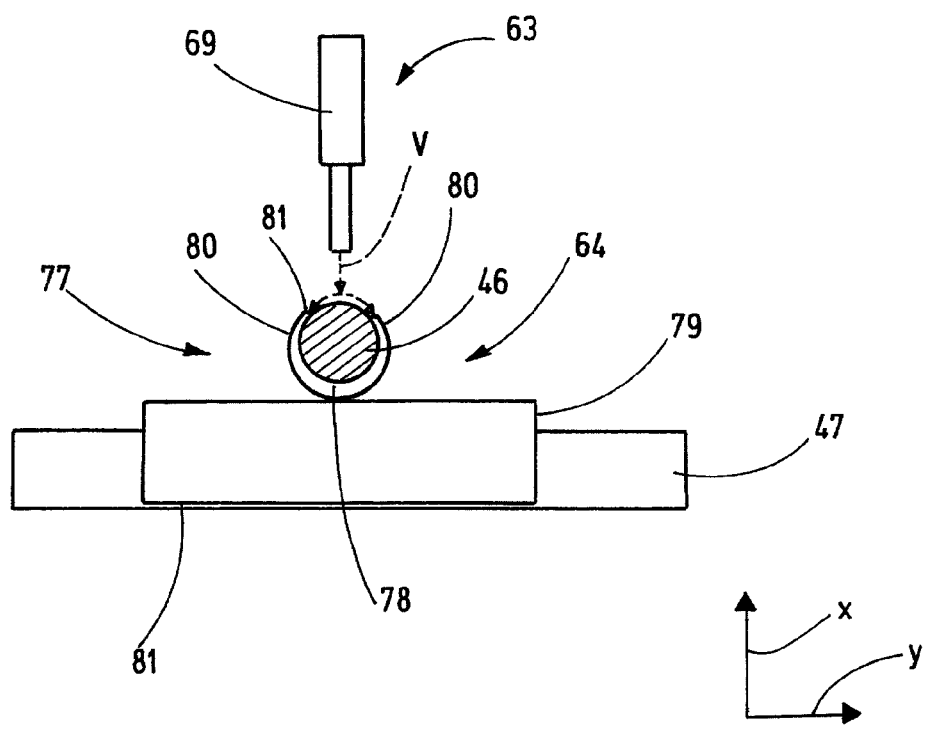
FIG. 11 shows an exemplary embodiment of a dispensing device for dispensing connecting material between portions of the bars and the push-on connection part in FIG. 10.
Figure 12:
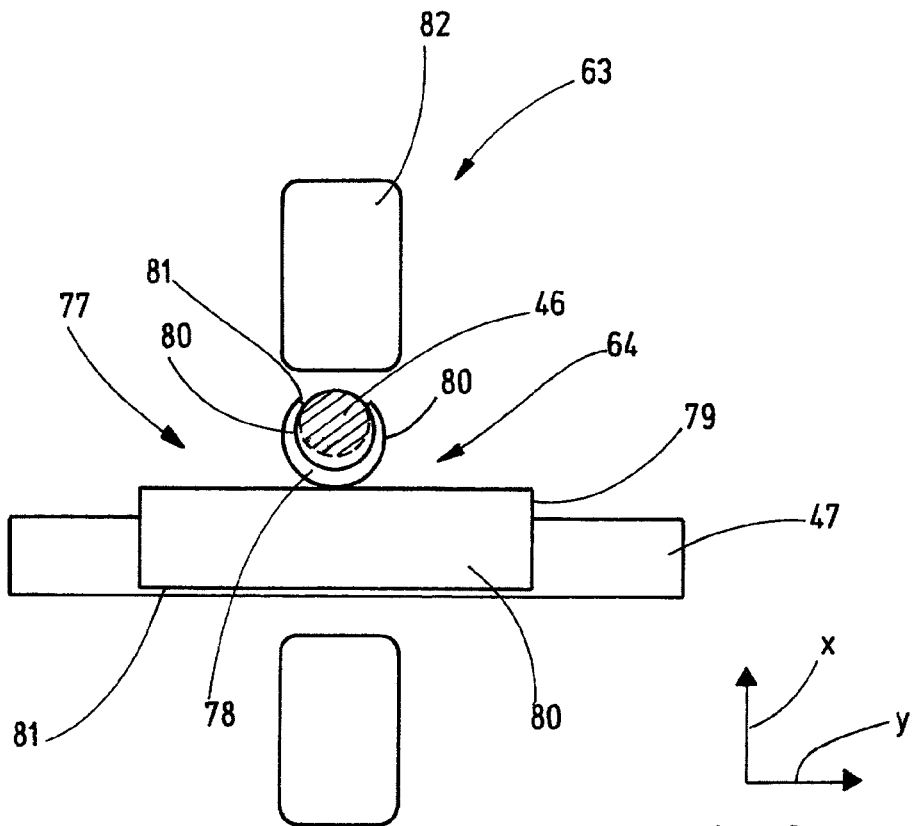
FIG. 12 shows an alternative embodiment of the dispensing device, in which a plastics material of the push-on connection part is used as connecting material and is made flowable by the input of energy.

As can be seen in particular in FIGS. 11 and 12, the wall thickness of the clamping limbs 80 can decrease in the direction of the slot 81.

The push-on connection parts 77 for example can be firstly pushed onto the longitudinal bars 46 or alternatively onto the transverse bars 47 at the relevant intersection points 64. The other bars 47 or 46 respectively are then likewise connected to the push-on connection parts 77 at the intersection points 64. A positively engaged and/or interlocking connection is thus created between a longitudinal bar 46 and a transverse bar 47 at each intersection point 64.

Two possible variants of the further sequence of the process will now be explained with reference to FIGS. 11 and 12. In the exemplary embodiment shown in FIG. 11 a liquid connecting means V of low viscosity is applied by means of the dispensing device 63 with the metering device 69 to the portions of the longitudinal bar 46 and of the transverse bar 47 which extend through the longitudinal part 78 or the transverse part 79. The connecting means V, in so doing, flows in remaining gaps and spaces that remain between the two clamping limbs 80 and the outer surface of the particular bar 46, 47. Such gaps can also be formed by defined unevennesses on the inner side of the clamping limbs 80. The applied connecting means V can then be cured as in the exemplary embodiments described above, for example by means of the curing device 66.

A further possibility is shown schematically in FIG. 12. There, the plastic of the push-on connection part 77 is at least partially softened or liquefied. For this purpose, the dispensing device 63 can have an energy input device 82. The energy input device 82 for example can introduce ultrasonic waves into the push-on connection part 77 at the intersection point 64 and can guide a welding between the push-on connection part 77 and the relevant portions of the bars 46, 47 at the intersection point 64. The energy input device 82 can be formed accordingly as an ultrasound welding device. Here, the connecting material V is obtained or extracted so to speak from the plastics material of the push-on connection part 77. Some of the plastics material of the push-non-connection part 77 is thus used as connecting material V.

In a further method variant connecting material V can additionally be completely spared. Here, at least one of the bars 46, 47, which rest against one another at an intersection point 64, is not cured. The reinforcement mesh 45 is then cured as a whole in the curing device 66. The main difference in this method lies in the fact that additional connecting material V is spared. Otherwise, the process is performed similarly to the illustration according to FIGS. 13 and 14. Here, it is possible that some of the longitudinal bars 46 or transverse bars 47 are already cured and are cured again so to speak in the curing device 66, for example are heated again. However, it has been found that no disadvantageous effects are experienced as a result of this in the already cured bars 46 and 47. The curing device 66 can otherwise be embodied as described above.

In a further variant of the method the used connecting material V can be identical to the resin H of the bars 46, 47. The renewed curing of bars 46, 47 already cured in order to cure the connecting material V does not have any disadvantageous effects.

In all methods it must be ensured when using the curing device 66 that there is no harmful effect on resin that has already been cured, for example as a result of thermal breakdown due to excessive temperatures. In the case of thermal curing, either a lower or the same curing temperature is used in the curing device 66 as for the curing of the resin H of the bars 46, 47.

In all methods a portion of the longitudinal bar 46 and of the transverse bar 47 that is free of connecting material V remains between the intersection points 64. The connecting material V is applied selectively to the respective intersection points 64. The properties of the bars 46, 47 are thus maintained. For example, the bending properties of the bars 46, 47 of the reinforcement mesh 45 are not compromised by the cured connecting means V.

Besides the saving of the amount of connecting material V, there is in particular also no waste material of the bars 26. The cutting device 41 in the cutting station 40 can be controlled in such a way that, in order to produce a reinforcement mesh 45 with a desired contour, merely bars 26 of the necessary length are produced and then used to form the reinforcement mesh 45. As is shown by way of example in FIG. 13, both the longitudinal bars 46 and the transverse bars 47 can be of different lengths at different points of the reinforcement mesh 45. However, it is not necessary to trim a produced reinforcement mesh 45, thus forming waste material, and instead bars 26 already in the exact necessary length are used as longitudinal bars 46 and/or transverse bars 47. A control device of the apparatus 24 can specify the number and length of the necessary bars 26, which are then produced accordingly in the cutting station 40 by cutting the strand material 38 to length.

The entire apparatus 25, 63 therefore operates very efficiently.

Figure 17:
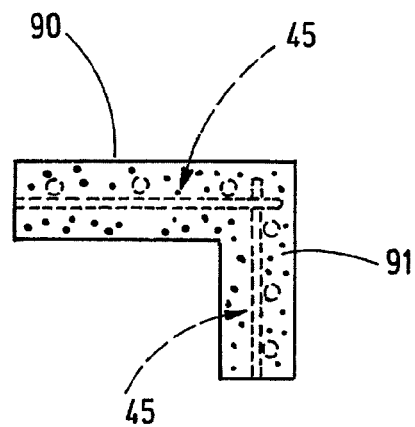
Figure 18:
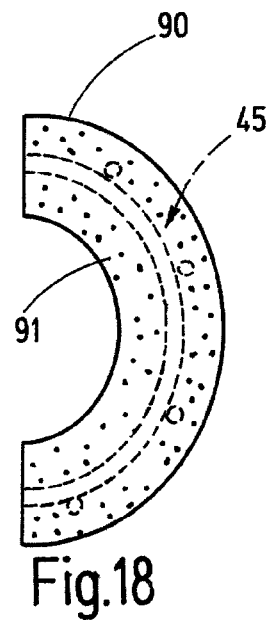

The reinforcement mesh 45 can be used to produce a component 90, for example a concrete component. To this end, the reinforcement mesh 45 is incorporated in a matrix, in particular a cement matrix 91 of the component 90. Prior to the incorporation in the cement matrix 91, it is also possible to connect a number of reinforcement meshes to one another by means of the connecting material V (FIG. 17). Any three-dimensional reinforcement elements or reinforcement bodies formed of individual reinforcement meshes 45 or of a reinforcement mesh 45 with further bars 46, 47 connected thereto can also be constructed for incorporation in the cement matrix 91. A three-dimensional reinforcement body of this kind can consist of bars 46, 47, which extend parallel to a plane and at least one bar which extends at an incline or at right angles to this plane. These bars can be connected to one another at the intersection points as explained above.

The invention relates to a method and an apparatus 25, 48, 63 for producing a reinforcement mesh 45. Here, a reinforcement fiber strand 29 is firstly saturated with a resin H and cured to form a cured, fiber-reinforced strand material 38. The strand material 38 present as an endless material is then cut lengthwise into bars 26, which are then used as longitudinal bars 46 or transverse bars 47 for forming the reinforcement mesh 45. A connecting material is used at each intersection point 64 between a longitudinal bar 46 and a transverse bar 47 and is dispensed in liquid form at the intersection point 64 or is liquefied and then cured at the intersection point 64. A fixed connection is thus created between the longitudinal bars 46 and the transverse bars 47 at the intersection points. Between the intersection points 64, the longitudinal bars 46 and the transverse bars 47 have portions that are free of connecting material V.

LIST OF REFERENCE SIGNS 25 apparatus
25 rod
27 storage device
28 reel
29 reinforcement fiber strand
30 conveying device
31 saturation station
32 deflection roll
33 bath
36 stripping station
37 curing station
38 strand material
39 braking device
40 cutting station
41 cutting device
45 reinforcement mesh
46 longitudinal bar
47 transverse bar
48 manipulator device
49 support surface
50 separating unit
51 storage container
52 dispensing shaft
53 slot-like opening
54 actuator
55 linear drive
56 slide
57 rail
60 gripper device
61 gripper finger
63 dispensing device
64 intersection point
65 pipe or line
69 metering device
70 mold
71 mold part 72 feed line
77 push-on connection part
78 longitudinal part
79 transverse part
80 clamping limb
81 slot
90 component
91 cement matrix
H resin
V connecting material
x spatial direction
Y spatial direction
z spatial direction

The invention claimed is:

1. A method for producing a reinforcement mesh (45), the method comprising:
    feeding a reinforcement fiber strand (29) to a saturation station (31) via a conveying device (30),
    saturating the reinforcement fiber strand (29) with a resin (H),
    stripping an excess resin amount of the resin (H) from the saturated reinforcement fiber strand (29) in a stripping station (36),
    forming an uncured fiber-reinforced strand material (38) or curing the resin (H) in a curing station (37) to form a cured fiber-reinforced strand material (38),
    producing bars (26) by cutting the fiber-reinforced strand material (38) to a length in a cutting station (40),
    depositing a plurality of the bars (26) side-by-side as longitudinal bars (46) using a manipulator device (48),
    depositing another plurality of the bars (26) as transverse bars (47) on the longitudinal bars (46) using the manipulator device (48),
    connecting the transverse bars (47) and the longitudinal bars (46) at intersection points (64) thereof by:
        a) applying with a dispensing device a curable connecting material (V) exclusively to the intersection points (64), at each of which one of the longitudinal bars (46) and transverse bars (47) come into contact, either after the longitudinal and transverse bars are in contact, or prior to the transverse bars (47) being deposited on the longitudinal bars (46), and curing the connecting material (V) for connection of the transverse bars (47) to the longitudinal bars (46) at the intersection points (64) when the longitudinal bars (46) and/or transverse bars (47) are already cured, or
        b) curing the longitudinal bars (46) and/or transverse bars (47) for connection of the transverse bars (47) to the longitudinal bars (46) at the intersection points (64) when the longitudinal bars (46) and/or transverse bars (47) are not yet cured prior to connection thereof.

2. The method according to claim 1, further comprising holding the saturated reinforcement fiber strand (29) under tensile stress during the curing thereof.

3. The method according to claim 1, further comprising establishing the connection at the intersection points (64) without additional connecting material during the curing of the resin (H) of a longitudinal bar (46) and/or a transverse bar (47), or establishing the connection at the intersection points (64) using a second resin as the connecting material (V), the second resin having a curing property different from the resin (H) of the longitudinal bars (46) and transverse bars (47).

4. The method according to claim 3, wherein the connection is established using a second resin as the connecting material (V), the second resin having a curing property different from the resin (H) of the longitudinal bars (46) and transverse bars (47), further comprising curing the second resin at a different temperature compared to the resin (H) of the longitudinal bars (46) and transverse bars (47).

5. The method according to claim 3, wherein the connection is established using a second resin as the connecting material (V), the second resin having a curing property different from the resin (H) of the longitudinal bars (46) and transverse bars (47), further comprising curing the second resin used as connecting material (V) by supplying heat or by induction, and curing the resin (H) of the longitudinal bars (46) and transverse bars (47) by irradiation with light or vice versa.

6. The method according to claim 1, further comprising conveying the reinforcement fiber strand (29) and the strand material (38) as an endless material by a conveying device (30) to the cutting station (40).

7. The method according to claim 6, wherein the conveying device (30) is arranged after the curing station (37) and the method further comprising exerting a tensile force by the conveying device (30) onto the strand material (38).

8. The method according to claim 1, further comprising controlling a cutting device (41) of the cutting station (40) to produce a specified number of the bars (26) each of a specified length for a reinforcement mesh (45).

9. The method according to claim 1, further comprising:
    applying a predetermined amount of the connecting material (V) to a transverse bar (47) on all sides thereof at intersection points (64) using the dispensing device (63), and
    laying the transverse bar (47) on the longitudinal bars (46).

10. The method according to claim 1, further comprising:
    applying a predetermined amount of the connecting material (V) to the longitudinal bars (46) at all intersection points (64) using the dispensing device (63), and
    laying the transverse bars (47) on the longitudinal bars (46).

11. The method according to claim 1, wherein the dispensing device (63) has a mold (70) having two mold parts (71), and the mold parts (71) each surround one of the intersection points (64) once at least one of the transverse bars (47) has been deposited on the longitudinal bars (46), and wherein the method further comprises conveying the connecting material (V) into the mold (70), which is closed around the intersection point (64), and is then cured.

12. The method according to claim 1, wherein at each intersection point (64) a push-on connection part (77) of a plastic material is first connected to one of the longitudinal bars (46) or transverse bars (47) at the intersection point (64) thereof and is then connected to the other of the transverse or longitudinal bars (47 or 46) at the intersection point (64) thereof by being pushed in place or pushed on.

13. The method according to claim 12, wherein, once a connection has been established at the intersection point (64) by the push-on connection part (77), introducing the connecting material (V) into gaps between portions of the one longitudinal bar (46), the one transverse bar (47), and the push-on connection part (77), and the connecting material (V) is then cured.

14. The method according to claim 12, further comprising using at least a portion of the plastic material of the push-on connection part (77) as connecting material (V), wherein the plastic material is made flowable by introducing energy by the dispensing device (63) and the plastic material is then cured.

15. The method according to claim 1, further comprising connecting a reinforcement mesh (45) to at least one further bar (45, 46) or to a further reinforcement mesh (45) to form a three-dimensional reinforcement body.

* * * * *